(12) United States Patent
Tohdoh

(10) Patent No.: US 8,814,175 B2
(45) Date of Patent: Aug. 26, 2014

(54) METAL SEAL

(71) Applicant: Mitsubishi Cable Industries, Ltd., Tokyo (JP)

(72) Inventor: Satoshi Tohdoh, Arida (JP)

(73) Assignee: Mitsubishi Cable Industries, Ltd., Tokyo (JP)

(*) Notice: Subject to any disclaimer, the term of this patent is extended or adjusted under 35 U.S.C. 154(b) by 0 days.

(21) Appl. No.: 13/742,702

(22) Filed: Jan. 16, 2013

(65) Prior Publication Data

US 2013/0193650 A1 Aug. 1, 2013

(30) Foreign Application Priority Data

Jan. 27, 2012 (JP) .................................. 2012-014792

(51) Int. Cl.
*F16J 15/02* (2006.01)

(52) U.S. Cl.
USPC .......................................... 277/647; 277/644

(58) Field of Classification Search
CPC .......... F16J 15/0887; F16J 15/06; F16J 15/34
USPC .................................................. 277/644, 647
See application file for complete search history.

(56) References Cited

U.S. PATENT DOCUMENTS

| | | | | |
|---|---|---|---|---|
| 2,927,830 | A | * | 3/1960 | Workman ........................ 92/194 |
| 3,917,288 | A | * | 11/1975 | Huber et al. .................. 277/368 |
| 5,716,052 | A | * | 2/1998 | Swensen et al. .............. 277/647 |
| 6,648,333 | B2 | * | 11/2003 | Aksit et al. ..................... 277/316 |
| 8,393,400 | B2 | * | 3/2013 | Buckle ........................... 166/368 |
| 2011/0120697 | A1 | * | 5/2011 | Buckle ........................ 166/75.11 |

FOREIGN PATENT DOCUMENTS

JP 2009-24838 A1 2/2009

* cited by examiner

*Primary Examiner* — Gilbert Lee
(74) *Attorney, Agent, or Firm* — Kratz, Quintos & Hanson, LLP

(57) ABSTRACT

A metal seal which can be fastened by low fastening force and can show sufficient sealing ability when receiving fluid pressure. The metal seal is composed a U-shaped metal thin seal and a reinforcing outer-fit member which receives side wall portions and a bottom wall portion of the thin seal from a back side.

5 Claims, 9 Drawing Sheets

METAL SEAL

BACKGROUND OF THE INVENTION

1. Field of the Invention

This invention relates to a metal seal.

2. Description of the Related Art

Conventionally, metal seal 41 shown in FIG. 7 is known (refer to Japanese patent provisional publication No. 2009-24838, for example). That is to say, the cross-sectional configuration is U-shaped type, of which thickness dimension $T_{41}$ is large, having a bottom wall portion 42 and side wall portions 43, an outer face of the end of the side wall portion 43 has a small protruding portion 44 for sealing, and the cross-sectional configuration has a concave groove portion 45 which receives fluid pressure.

When the above-described small protruding portions 44 are pressed to parallel two flat faces 46 and 47 and show sealing function, a press-fit state is made with extremely large contact pressure because the thickness dimension $T_{41}$ is large.

the metal seal 41 shown in FIG. 7 of which thickness dimension $T_{41}$ is large may not be used, in case that the material of two flat faces 46 and 47 are brittle or easily damaged or easily deformed. Further, the metal seal 41 of which thickness dimension $T_{41}$ is large can't be used for the position where the compressive force is small when not pressurized.

The inventor of the present invention therefore made metal seals of which thickness dimension $T_{48}$ in U-shaped cross section is small as shown in FIG. 8, and repeated many experiments. That is to say, the metal thin seal 48 has a contact small protruding portion 49 on the end of the outer face, and is made with the same small thickness dimension $T_{48}$.

However, it is revealed that the thin seal 48 has a problem as follows. That is to say, as shown in FIG. 9, when used for sealing between the first member 31 which has a rectangular sealing groove 33 and the second member 32 which has a flat face portion 34, the thin seal 48A in original shape shown by two-dot broken line in FIG. 9, when receiving fluid pressure P is excessively deformed into a configuration 48C shown by a continuous line and press-fit to a flat face portion 34, a bottom face 33A, and a side face 33B of the rectangular sealing groove 33 at five positions $Y_1$, $Y_2$, $Y_3$, $Y_4$, $Y_5$. Although the thin metal seal 48 should be press-fit at three positions $Y_1$, $Y_5$ and $Y_3$ shown in FIG. 9, there is a first problem that the small protruding portions 49, which should have desired sealing function, don't have enough contact pressure when fit to the flat face portion 34 and the bottom face 33A of the sealing groove 33, consequently, total sealing function decreases, because the side wall portions 35 of the U-shaped thin seal 48 are strongly press-fit to the flat face portion 34 and the bottom face 33A.

Further, it is also revealed that the cross-sectional configuration of the thin seal 48 has an unusual shape by plastic deformation shown in FIG. 10 when the thin seal 48 is taken out after the pressure-receiving state as shown in FIG. 9. That to say, an original shape 48A shown by a two-dot broken line in FIG. 10 changes into a shape shown by a continuous line because of plastic deformation. Thus, there is a second problem that the small protruding portions 49 can't fit to the flat face portion 34 and the bottom face 33A with enough contact pressure when plastic deformation occurred. Therefore, fluid leakage occurs and the thin seal 48 can't be used and life is short after comparatively short period of use time under used condition in which fluid pressure P changes up and down.

It is an object of the present invention to provide a metal seal with which the above mentioned problems are resolved, which can be compressed by small force, used for a portion where the fastening force, making the parallel two faces close is small, not generating unusual deformation (plastic deformation) under the pressure-receiving state by the fluid pressure, and having stable sealing function for a long period of use. Especially, it is an object to provide a metal seal which has stable sealing function for a long period of use at a used portion where the fluid pressure changes high and low, or where two flat faces repeatedly open and close, and repeatedly slight press-fit and release.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
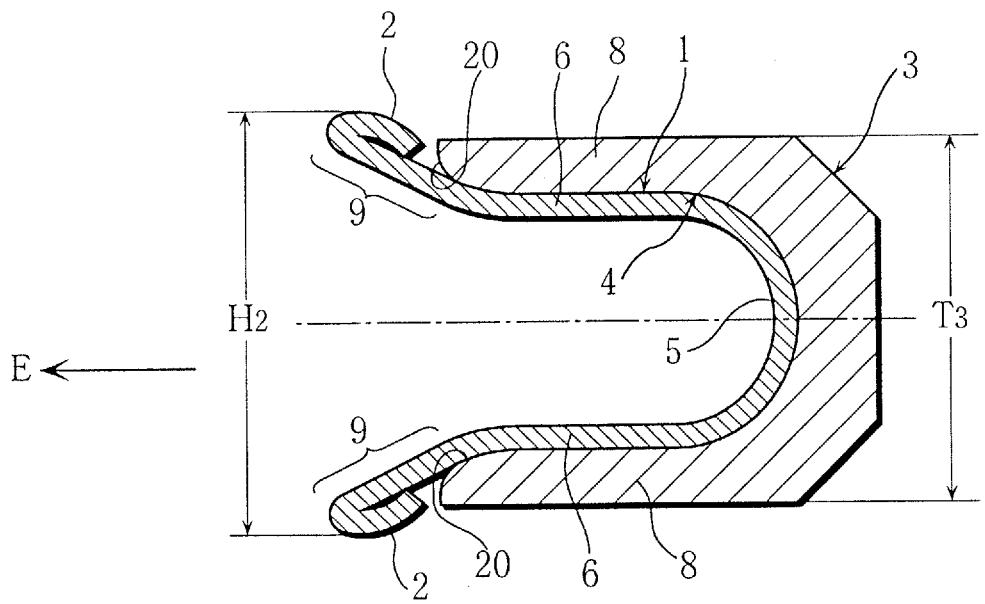
FIG. 1 is a cross-sectional view of a principal portion in a free state showing an embodiment of the present invention.

In FIG. 1, a metal seal is composed of a metal thin seal 1, of which cross-sectional configuration is U-shaped or tulip-shape, and a metal reinforcing outer-fit member 3 of U-shaped cross section which restricts (prevents) the thin seal 1 from being deformed when receiving fluid pressure.

Specifically, in FIG. 1, the thin seal 1 is tulip-shape, of which end has a contact small protruding portion for sealing. For example, the thin seal 1 is made by folding and pressing into tulip-shape with a thin metal plate (material). And, the ends are folded a little to form contact small protruding portions 2 (refer to FIG. 1 and FIG. 3 through FIG. 6). Further, although in another embodiment shown in FIG. 2, the thin seal 1 is tulip-shaped of thin metal plate (material), the end, of which outer surface protrudes like a round hill, is made into the contact small protruding portion 2 by plastic working, brazing, or welding. And, by making the contact small protruding portion 2 a little larger hill-shape shown by two-dot broken line in FIG. 2, it is possible that the metal seal has certain sealing function under pressurized state as shown in FIG. 6 described below.

And, the reinforcing outer-fit member 3, which has a concave groove 4 for fitting the thin seal 1, is U-shaped in cross section. A curved bottom wall portion 5 and side wall portions 6 of the thin seal 1 tightly fit the concave groove 4 for fitting under a free state shown in FIG. 1 or FIG. 2. Therefore, the deformation of the bottom wall portion 5 and the side wall portions 6 are restricted as in FIG. 5 and FIG. 6 described below.

As shown in FIG. 3 through FIG. 6, the metal seal of the present invention, which is a double-structure seal so to speak, is the seal which seals between parallel two flat faces 11 and 12. Although whole shape is not shown in Figures, it is circular-shape, rectangular-shape, race-track shape, or any other closed loop shape. And, in FIG. 3 through FIG. 6, a first member 31 has a sealing groove 7, of which bottom face 7A corresponds to the flat face 12 described above. And, the lower face of the second member 32 in the Figures corresponds to another flat face 11.

Figure 2:
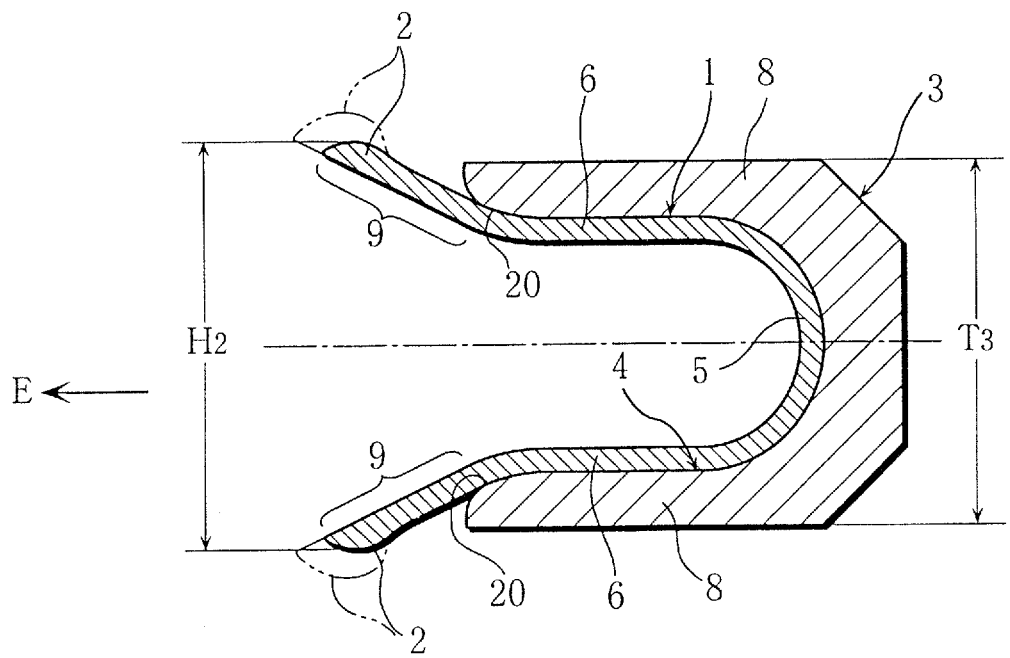
FIG. 2 is a cross-sectional view of a principal portion in a free state showing another embodiment.
Figure 3:
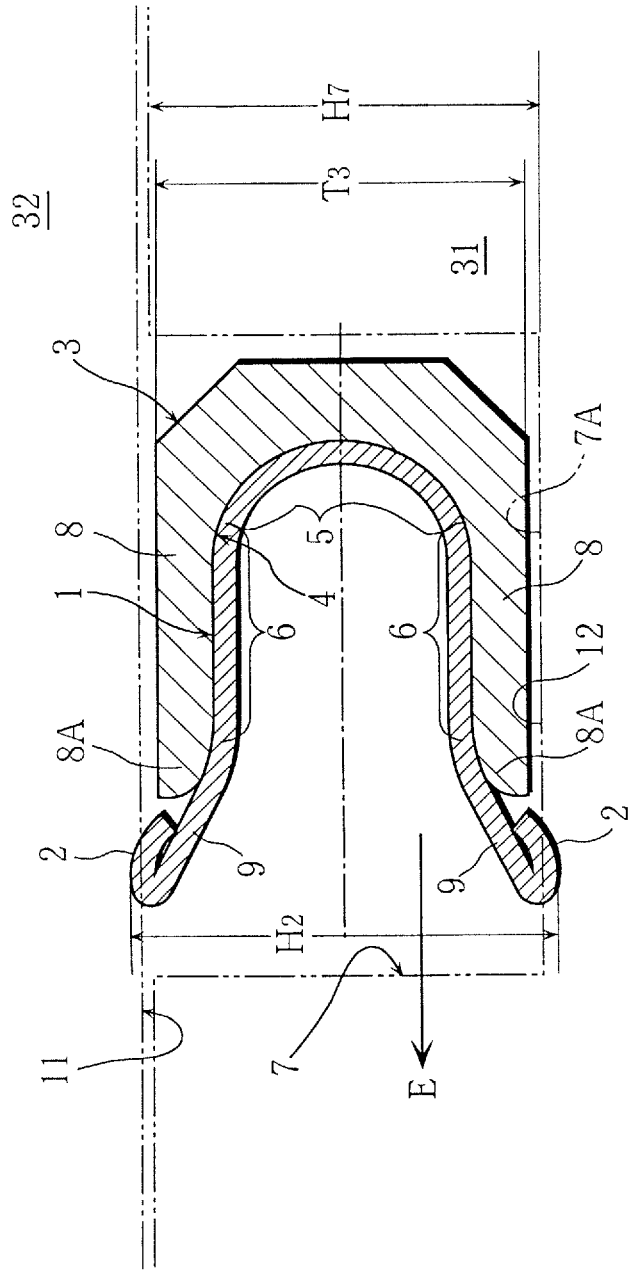
FIG. 3 is a cross-sectional view to explain dimensional relationship between a sealing groove and a metal seal.

As described above, the metal seal of the present invention is the seal which seals between the parallel two flat faces 11 and 12, and a mutual interval dimension $H_2$ between a pair of contact small protruding portions 2 of the thin seal 1 (as an inner seal) is larger than a thickness dimension $T_3$ of the reinforcing outer-fit member 3 (refer to FIG. 1 through FIG. 3). That is to say, it is set to be $H_2 > T_3$. This is applied to a non-attached free state. Concretely, the relational expression $H_2 > T_3$ is also established under each used state (each attached state) shown in FIG. 4, FIG. 5, and FIG. 6.

Explaining in detail further, it can be said that the thin seal (unitedly) has a pair of elastic flat spring-like protruding piece portions 9 which protrude to an opening direction E from the ends 8A of a pair of side wall portions 8 of the reinforcing outer-fit member 3. Further, the contact small protruding portion 2 is formed at the outer face of the end of the protruding piece portion 9. Therefore, as clearly shown in the attached and used state shown in FIG. 3 through FIG. 6, the pair of elastic flat spring-like protruding piece portions 9 is the portion which has main sealing function of the metal seal of the present invention, and is called "main sealing protruding piece portion".

And, the reinforcing outer-fit member 3 always slightly contacts or doesn't contact the parallel two flat faces 11 and 12. That is to say, the thickness dimension of the reinforcing outer-fit member 3 is set to be the thickness dimension $T_3$, by which the reinforcing outer-fit member 3 doesn't press-fit to the parallel two flat faces 11 and 12. Especially, the thickness dimension $T_3$ is smaller than the depth dimension $H_7$ of the sealing groove 7 as shown by FIG. 3. And, the reinforcing outer-fit member 3 has flat faces on the outer faces of the side wall portions 8, which have no small protruding portion for sealing by press-fitting to the parallel two flat faces 11 and 12.

And, the shape of the concave groove for fitting 4 of the reinforcing outer-fit member 3 is, as shown in FIG. 1 or FIG. 2, same as the shape of the outer face of the bottom wall portion 5 and the side wall portions 6 of the thin seal 1 to contact the inner-fit thin seal 1 with the same small contact pressure. And, the end shape of both side wall portions 8 is a large R-shaped chamfer 20 on inner side.

The outer face of the elastic flat spring-like main protruding piece portion 9 can be elastically deformed to smoothly contact and part from the end of the side wall portion 8 of the R-shaped chamfer 20 (refer to FIG. 3 through FIG. 6).

Figure 4:
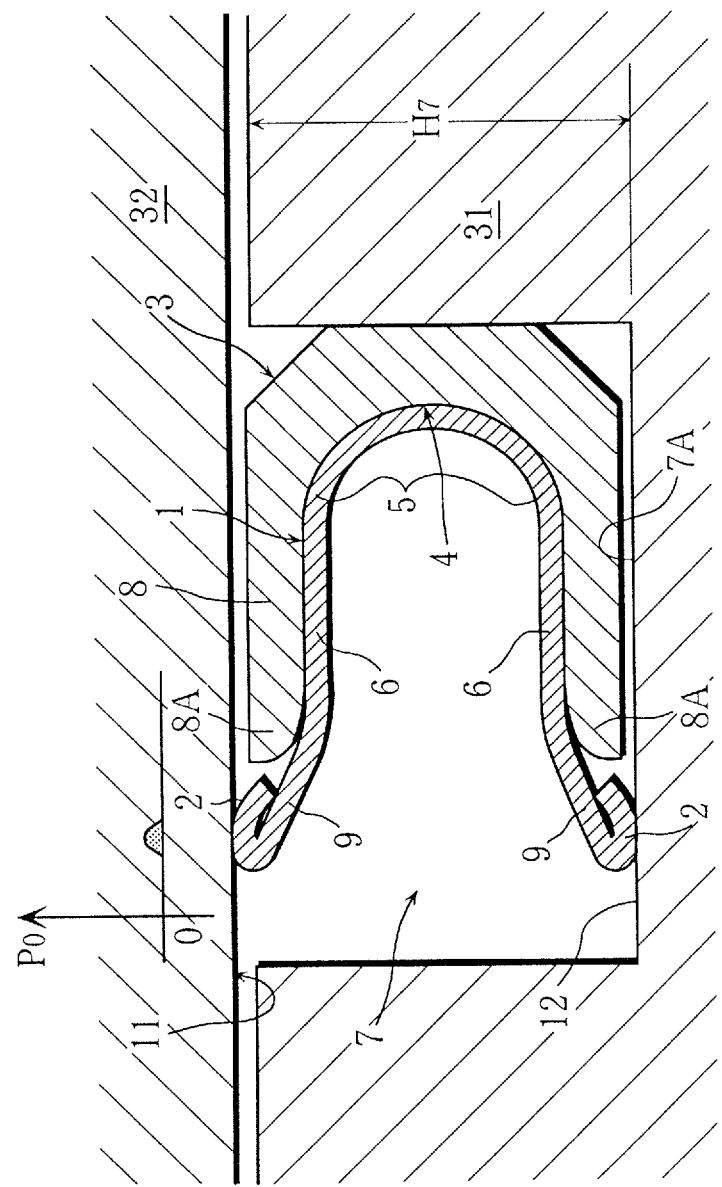
FIG. 4 is an explanatory view of an attached and not pressurized state.

Next, FIG. 4 shows an attached and non-pressurized state. The graph of the contact pressure in FIG. 4 shows position on axis of abscissa and contact pressure $P_0$ on axis of ordinate. In this metal seal, the contact pressure $P_0$ to the parallel flat faces 11 and 12 is very small, therefore, the metal seal is the seal which can be fastened between the parallel flat faces 11 and 12 by small fastening force.

Figure 5:
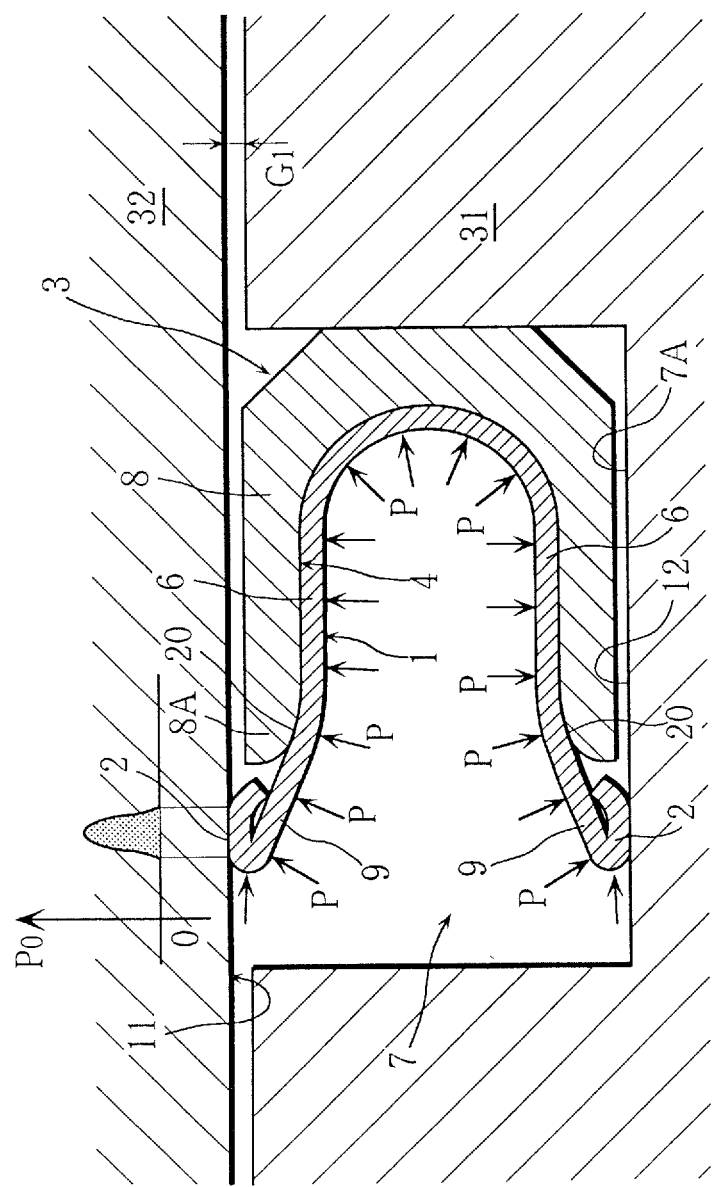
FIG. 5 is an explanatory view of an attached and pressurized state.
Figure 6:
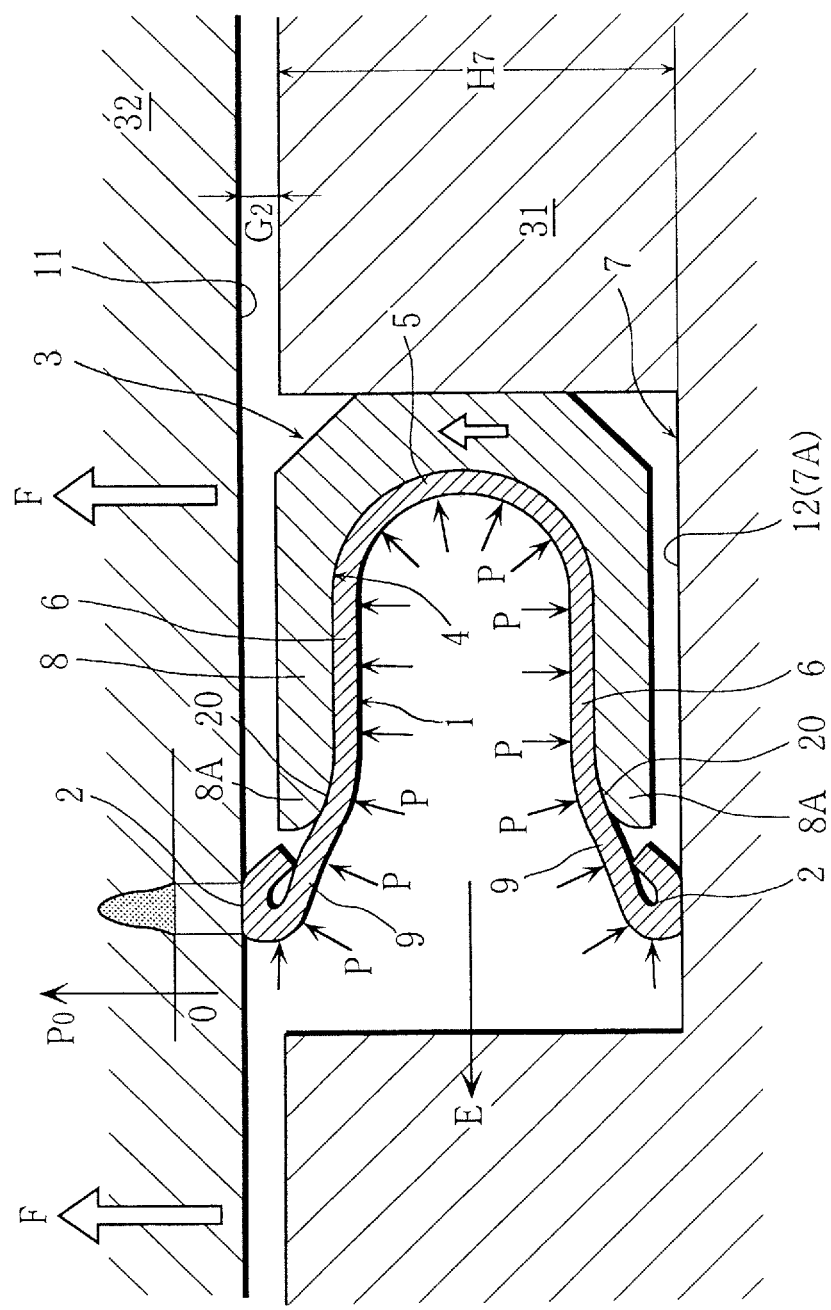
FIG. 6 is an explanatory view of an attached and pressurized state under another used condition.
Figure 9:
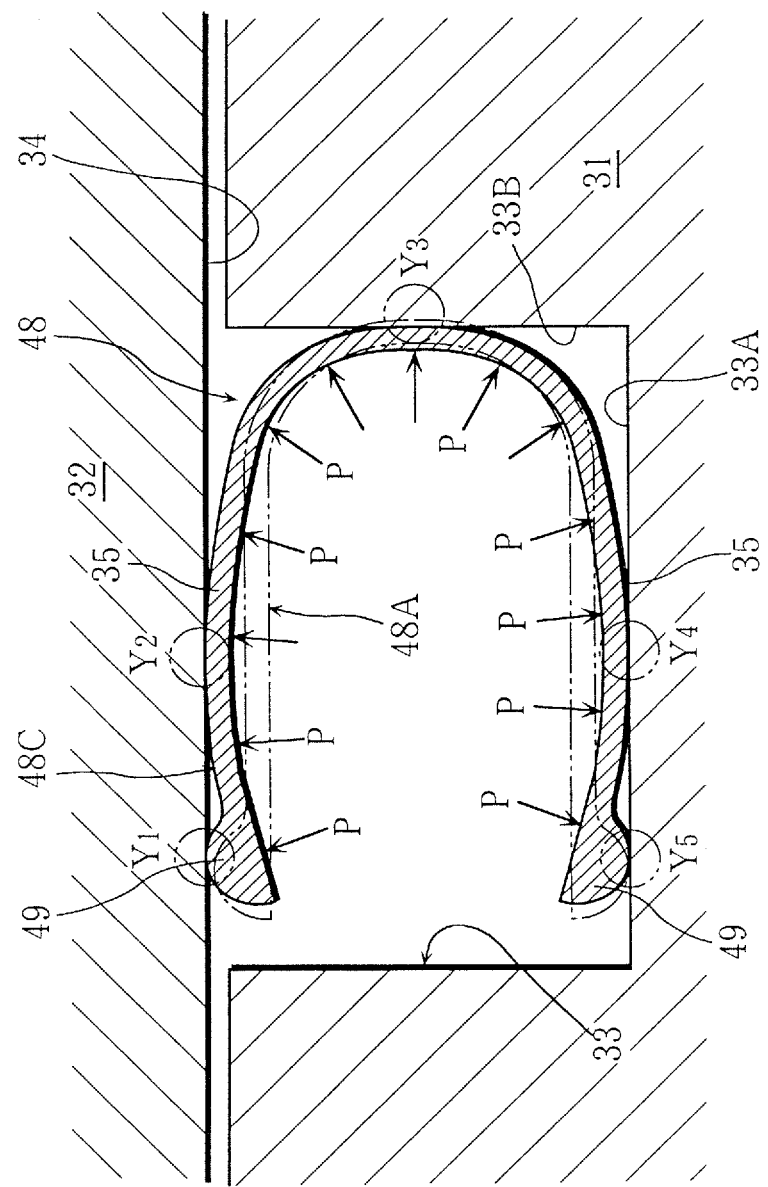
FIG. 9 is a cross-sectional view showing a pressurized state of comparison example.
Figure 10:
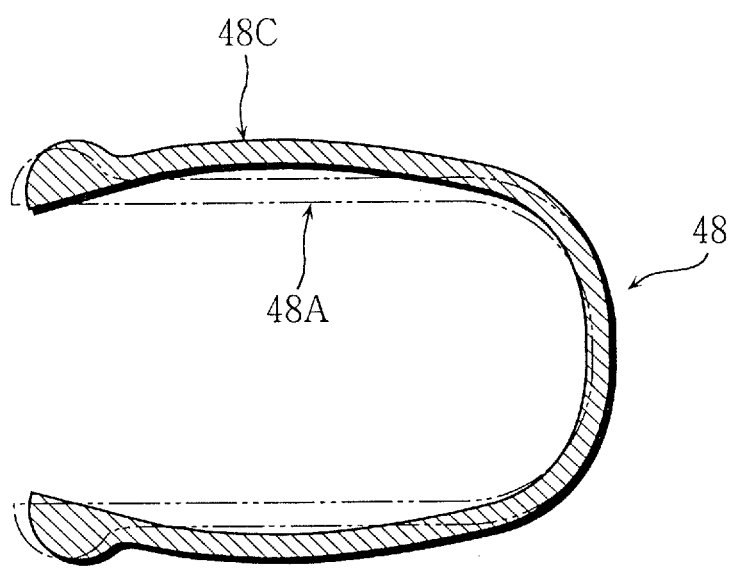
FIG. 10 is an explanatory cross-sectional view of taken-off state after pressurization.

And, in an attached and pressurized state shown in FIG. 5, when fluid pressure P works, (the contact small protruding portion 2 of) the protruding piece portion 9, which extends and parts from the R-shaped chamfer 20 of the side wall portion 8 of the reinforcing outer-fit member 3, is rather strongly press-fit to the flat faces 11 and 12 with the contact pressure as shown in contact pressure graph in FIG. 5 by the fluid pressure P received from the inner face, and sealing function is certainly conducted. The other portion of the thin seal 1 (the side wall portions 6 and the bottom wall portion 5) are not deformed when receiving the pressure P, and the problem explained with the comparison example in FIG. 9 and FIG. 10 can be solved. That is to say, excessive deformation is prevented from being generated under the pressurized state, and, the contact small protruding portion 2 (49) press-fits with suitable contact pressure $P_0$, and has excellent sealing function (sealing ability). Further, excessive plastic deformation shown in FIG. 10, and life of the seal is greatly extended because the metal seal can be used for a long time under used condition (circumstances) that fluid pressure P changes high and low.

Figure 7:
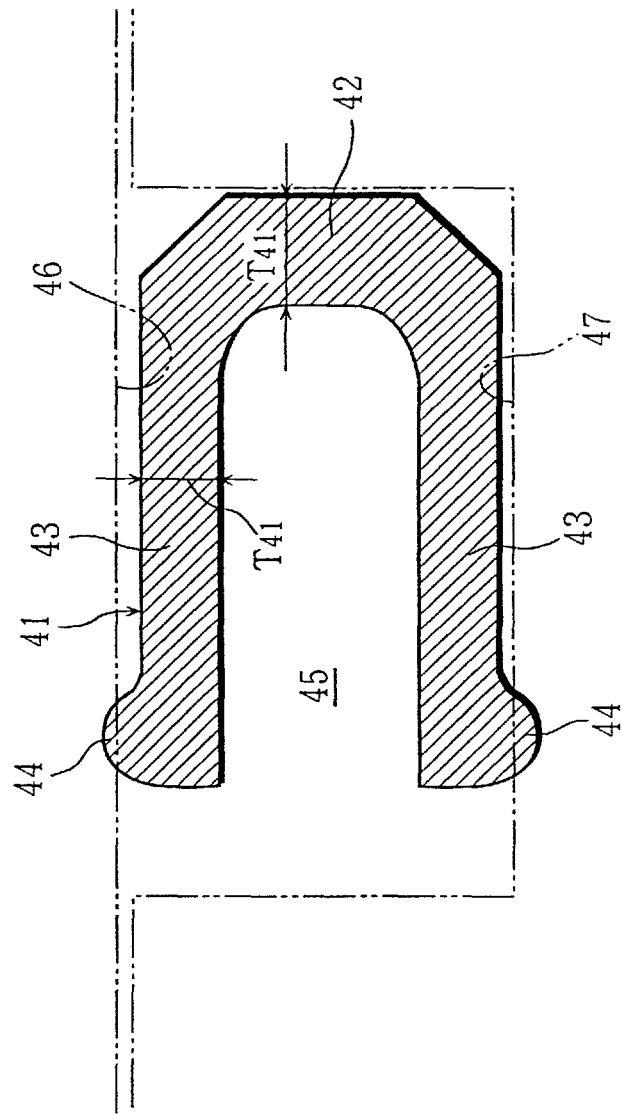
FIG. 7 is a cross-sectional view showing a conventional example.
Figure 8:
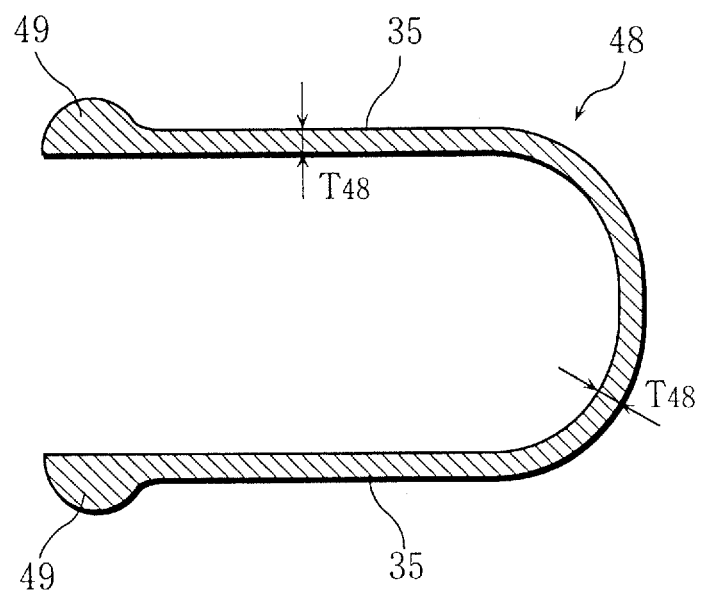
FIG. 8 is a cross-sectional view showing a comparison example.

FIG. 6 shows a used condition that the second member 32 (the flat face 11) moves for a small dimension in an arrow F direction, and a gap $G_1$ shown in FIG. 5 changes to a large gap $G_2$ shown in FIG. 6. However, the metal seal 41 of which thickness dimension $T_{41}$ is large as the conventional example shown in FIG. 7 can't be suitable for use under the unique used condition above, the metal seal of the present invention can stably and certainly seals with the contact pressure $P_0$ shown in FIG. 5 and FIG. 6 changing little. The reason of this is a pair of elastic flat spring-like main protruding piece portions 9, which protrudes from the ends 8A of the side wall portions of the outer-fit member 3 to the opening direction E, elastically and flexibly transforms and flexibly and certainly corresponds to the displacement of the flat face 11 in the arrow F direction.

In FIG. 6, not only under the unique used condition described above, but also in the case that the gaps $G_1$ and $G_2$ between the flat face 11 and the flat face 12 receiving the pressure P change, or in the case that the gaps $G_1$ and $G_2$ are different by built up common difference or processing common difference, the metal seal of the prevent invention can flexibly and certainly correspond and has stable and excellent sealing function (sealing ability).

And, the functions and effects described in FIG. 4 through FIG. 6 apply to the embodiment shown in FIG. 2.

In the present invention as described above, the problems described with FIG. 8 through FIG. 11 are solved, and the primary purpose is fulfilled because the metal seal, provided with the metal thin seal 1 of which cross-sectional configuration is U-shape or tulip-shape and of which end has the contact small protruding portion for sealing 2, and the reinforcing outer-fit member 3 of which cross-sectional is U-shape having the concave groove for fitting 4, of which concave groove for fitting 4 is fit to the bottom wall portion 5 and the side wall portions 6 of the thin seal 1, prevents the bottom wall portion 5 and the side wall portions 6 from being deformed when receiving pressure. That to say, the prevent invention prevents excessively plastic deformation shown in FIG. 10, and can stably seal for a long period of use. Especially, the metal seal has superior sealing function which corresponds enough to high fluid pressure with weak compressive force (fastening force).

That is to say, the metal seal of the prevent invention is the metal seal which can be transformed to desirable form by low fastening force though it is made of metal, and which, at the same time, doesn't have excessive deformation when receiving pressure, further, which has long life under used condition of repeating compression and pressure resistance.

And, the reinforcing outer-fit member 3 is prevented from being press-fit to the parallel flat faces 11 and 12, and the contact small protruding portions 2 always elastically and softly press-fit to the parallel faces 11 and 12 and have stable sealing function, because the metal seal which seals between the parallel two flat faces 11 and 12, of which mutual interval dimension $H_2$ of the pair of contact small protruding portions 2 of the thin seal 1 is larger than the thickness dimension $T_3$ of the reinforcing outer-fit member 3.

And, the compressive force (fastening force) is extremely low, and the metal seal is suitable for the case that the parallel flat faces 11 and 12 are made of delicate material or easily damaged, because the thin seal 1 has the pair of elastic flat spring-like main protruding piece portions 9 which protrude from the pair of side wall portions 8 of the reinforcing outer-fit member 3 to the opening direction E, and the contact small protruding portion 2 is made on the outer face of the end of the main protruding piece portion 9. And, by the protruding piece portion 9, the metal seal has excellent sealing function as a main seal and prevents leakage effectively.

The parallel two flat faces 11 and 12 are not damaged or deformed, and the thin seal 1 can be freely and elastically transformed, and having enough sealing function receiving the fluid pressure P, because the thickness dimension of the reinforcing outer-fit member 3 is set to the thickness dimension $T_3$ by which the reinforcing outer-fit member 3 is made slightly contact or not contact and not press-fit to the parallel two flat faces 11 and 12.

While preferred embodiments of the present invention have been described in this specification, it is to be understood that the invention is illustrative and not restrictive, because various changes are possible within the spirit and indispensable features.

What is claimed is:

1. A metal seal, provided with only two parts, one of which is a metal thin seal, of which cross-sectional configuration is U-shaped or tulip-shaped and of which each end has a contact small protruding portion for sealing, and another of which is a reinforcing outer-fit member, having edge portions, in which cross-sectional configuration is U-shaped, the reinforcing outer-fit member having a concave groove for fitting, the concave groove for fitting is directly fit to a bottom wall portion and side wall portions of the thin seal, the side wall portions of the reinforcing outer-fit member have mutually parallel flat faces, a forth end of the side wall portion of the reinforcing outer-fit member forms the edge portion, the bottom wall portion and the side wall portions of the metal thin seal are prevented from being deformed when receiving fluid pressure, a protruding piece portion of the thin seal is extended from an R-shaped chamfer of the reinforcing outer-fit member and elastically deformed as to increase and decrease a mutual interval dimension of the contact small protruding portions of the thin seal independently from a thickness dimension of the reinforcing outer-fit member, and a thickness of a side wall portion of the reinforcing outer-fit member is larger than a thickness of the side wall portion of the thin seal.

2. The metal seal as set forth in claim 1 sealing between parallel two flat faces, wherein the mutual internal dimension of a pair of contact small protruding portions of the thin seal is set to be larger than the thickness dimension of the reinforcing outer-fit member.

3. The metal seal as set forth in claim 2, wherein the thin seal has a pair of elastic flat spring-like main protruding piece portions which protrude from a pair of side wall portions of the reinforcing outer-fit member in an opening direction, and the contact small protruding portion is formed on an outer face of an end of the main protruding piece portion.

4. The metal seal as set forth in claim 2, wherein the thickness dimension of the reinforcing outer-fit member is set to be the thickness dimension by which the reinforcing outer-fit member is made slightly contact or not contact the parallel two flat faces.

5. The metal seal as set forth in claim 3, wherein the thickness dimension of the reinforcing outer-fit member is set to be the thickness dimension by which the reinforcing outer-fit member is made slightly contact or not contact the parallel two flat faces.

* * * * *